United States Patent Office 3,487,899
Patented Jan. 6, 1970

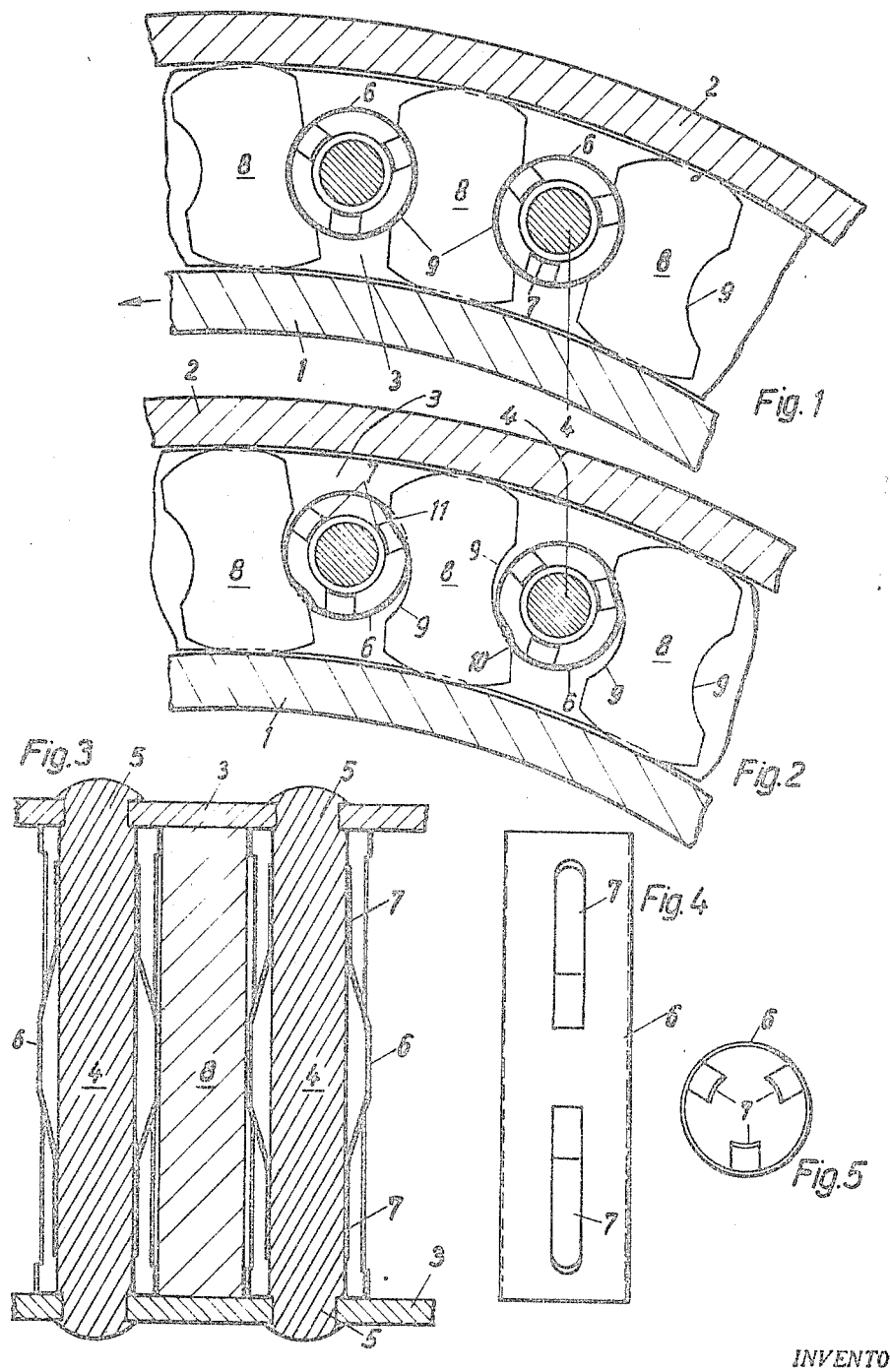

3,487,899
ONE-WAY CLUTCH
Peter Bass and Karl Bass, both of Industriestrasse 4,
Rothenburg ob der Tauber, Germany
Original application May 8, 1967, Ser. No. 636,712.
Divided and this application Sept. 24, 1968, Ser.
No. 797,290
Claims priority, application Germany, May 31, 1966,
B 87,364; Great Britain, Feb. 23, 1967, 8,701/67
U.S. Cl. 192—45.1                              2 Claims

ABSTRACT OF THE DISCLOSURE

For rotatively coupling two rotary members only for one direction of relative rotation between them, a clutch assembly composed of a plurality of pivotal clamping elements and bushings associated with the clamping elements and capable of being deformed by the pivotal movements of the clamping elements so as to apply a biasing force urging the clamping elements toward the position in which they couple the two rotary members together, the bushings being shiftable in a direction around the circumference of the clutch assembly for permitting the load forces on the clamping elements to be uniformly distributed among them, each bushing having a bore of polygonal cross section, a pin having the same cross section mounted in the bore of each bushing, the ends of each pin being rigidly connected to an annular side plate.

CROSS REFERENCE TO RELATED APPLICATION

This application is a division of co-pending application Ser. No. 636,712, filed May 8, 1967.

BACKGROUND OF THE INVENTION

The invention relates to a free-wheel, or one-way, coupling with an outer and an inner coupling member, pivotable clamping elements rounded off at both their sides, and a cage serving to receive and secure the pivotable clamping elements such that the latter are subject to a biasing pressure in the direction of rotation in which the coupling members are to be coupled in driving relationship.

German patent specification 1,142,254, teaches a free-wheel coupling in which the pivotable clamping elements, or shoes, are clamped into an annular metal strip and are biased by resilient tongues provided on the latter. In this known form of construction the strip metal cage is, for constructional reasons, made considerably wider than the pivotable clamping elements. As the pivotable clamping elements, in operation, only execute extremely small pivotal movements, the tongues of the metal strip are only moved a small distance so that the accompanying restoring force is very small.

In particular, when, after a long period of operation, the coupling surfaces of individual pivotable clamping elements have become worn, the clamping elements involved are no longer urged in the direction for coupling the rings, so that when the latter are coupled together impact shocks occur. Also, it is hardly possible to so manufacture the strip of metal, which is made of a high quality resilient material, that it will exert a constant resilient pressure on all of the pivotable clamping elements even after a long period of use. Since the different clamping elements of this known type of free-wheel coupling are subjected to varying degree of pressure for biasing them in the direction for coupling the coupling members together, they experience differing degrees of wear. Further, when the coupling occurs, load forces of differing magnitudes are applied to the pivotable clamping elements; this leads to correspondingly different degrees of wear of the clamping elements, as well as to impact shocks. The short resilient tongues readily show ageing phenomona and are subjected to heavy wear. Consequently the useful life of this form of coupling is limited.

German published application 1,200,616, discloses a cageless free-wheel, or one-way coupling in which specially bent spring elements are inserted between adjacently positioned clamping elements. In this form of construction, in the free-wheel, or free-running, condition, the pressure in the direction of mutual coupling of the coupling members is the difference between two oppositely directed force moments. It is readily clear that, in consequence of the manufacturing tolerances of the resilient elements, the resulting pressure moment varies to a large degree from clamping element to clamping element, so that the drawbacks referred to above are also present in this form of construction.

SUMMARY OF THE INVENTION

It is therefore a primary object of the present invention to eliminate the above-noted drawbacks and difficulties.

A more specific object of the present invention is to provide such a coupling in which dimensional inaccuracies are automatically compensated.

A further object of the present invention is to provide such a coupling in which the load forces on the coupling elements are uniformly distributed among them.

Yet another object of the present invention is to provide a coupling in which compensation is automatically made for the wear experienced by the clamping element bearing surfaces.

The present invention involves improvements in a one-way clutch assembly for rotatively coupling an outer rotary member to an inner rotary member for one direction of relative rotation between the members and for decoupling the members from one another for the opposite direction of relative rotation between them, which assembly includes annular side plates disposed between the inner and outer members, connecting pins extending between, and connecting, the plates, and a plurality of pivotable clamping elements interposed between the members, retained between the plates, and provided with rounded side portions by which they contact the members, the clamping elements being pivotable, under the influence of the relative rotation between the members, between a first position in which they couple the members rotatively together and a second position in which the members are operatively decoupled. The above-noted objects, and other objects according to the present invention are achieved by the improvement composed of a plurality of resilient bushings disposed between the plates and each mounted on a respective connecting pin, the bushings cooperating with the clamping elements, when the latter are in their second position, for urging the elements towards their first position, the bushings being moveable with respect to their associated pins in a direction perpendicular to the axes of their associated pins for compensating dimensional inaccuracies in the assembly and for placing the elements in force-transmitting communication with one another so as to produce a uniform distribution among the elements of the load forces applied thereto by the rotary members.

The operative principles of the form of the invention here claimed may be best appreciated by first considering the invention in the above-mentioned copending application, Ser. No. 636,712, filed May 8, 1967.

BRIEF DESCRIPTION OF THE DRAWINGS

FIGURE 1 is an axial cross-sectional view of a free-wheel coupling according to the invention disclosed in the above-mentioned application in the engaged or coupled condition.

FIGURE 2 is a partial view showing the free-wheel condition of the coupling of FIGURE 1.

FIGURE 3 is a partial longitudinal, cross-sectional view taken through the cake of FIGURE 1.

FIGURE 4 is an elevational view of a bushing of the arrangement shown in FIGURES 1–3.

FIGURE 5 is a cross-sectional view of the bushing of FIGURE 4.

DESCRIPTION OF THE PREFERRED EMBODIMENTS

Figure 6:
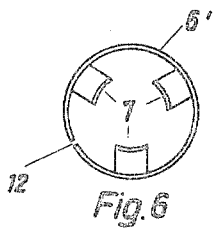
FIGURE 6 is a cross-sectional view of a modified form of the bushing.

In FIGURES 1 and 2 can be seen an inner cylindrical coupling member 1 and an outer cylindrical coupling member 2, between which is interposed the coupling cage, or one-way clutch assembly, defined by two annular side plates 3 lying perpendicular to the axis of the coupling and receiving between them the different structural parts. The cage may be made of steel or a similar metal or of plastic. In FIGURES 1 and 2 one of the side plates has been omitted so that the inner cage parts can be more clearly seen.

FIGURE 3 shows that between the plates 3 there are disposed pins 4 provided at their ends with narrowed neck portions 5 received by the plates 3 and, conveniently riveted thereto. The pins 4 interconnect plates 3 and support resilient bushings 6 which are preferably of cylindrical shape and which includes tongues, or tabs 7 which are cut out from the material of the bushings and then bent radially inwardly.

As illustrated in FIGURES 4 and 5, there are preferably provided two annular bands of tongues, with the tongues of each band forming a star pattern. The resilient tongues clamp the associated bushings 6 on the pins 4, and provide restoring forces for maintaining the bushings in centered position on the pins 4 and for urging the bushings to retain their cylindrical shape. Interposed between each adjacent pair of bushings 6 is a pivotable clamping, or coupling, element 8 which has opposite lateral wall portions directed toward the respective adjacent bushings, each wall portion being formed with a recess formed with recesses 9 whose transverse cross-sectional shape is complementary to that of the periphery of the bushings 6. This permits a more effective transmission of load forces to be achieved between the clamping elements and the bushings. Preferably the bushings 6 are of cylindrical peripheral contour, in which case the recesses 9 are shaped in a complementary manner as segments of a cylinder.

The manner of operation of one-way clutch, or coupling, is clear from FIGURES 1 and 2. FIGURE 1 illustrates the engaged or coupled condition of the coupling in which the inner coupling member 1, which rotates in the direction indicated by the arrow, transmits torque to the outer coupling member 2. In a manner known per se, the clamping elements 8 are wedged between the coupling members so that a frictional connection is established between those parts. As soon as the inner coupling member 1 begins to rotate slower than the outer coupling member 2, or as soon as the outer coupling member overtakes the inner coupling member, the pivotable clamping elements 8 are caused to pivot in counterclockwise direction, so as to assume the free-wheeling, or freethe resilient compression of the bushings 6 has been somewhat exaggerated for greater clarity.

As a consequence of the elastic deformation of bushings 6, a restoring force is applied to the edges 10 and 11 in a direction for urging the elements 8 back into a position where they couple the members 1 and 2 together. A torque is thus transmitted to the clamping elements 8 which causes them to remain in contact with the coupling members 1 and 2 during the free-wheeling condition of the coupling. It has been found that this makes it possible to prevent undesirable and harmful impact shocks from occurring when the coupling, or clutch, is once against engaged.

When the members 1 and 2 are in the coupled, or engaged position, the pivotable clamping elements 8 are securely held in the positions shown in FIGURE 1 by the pressure exerted by members 1 and 2 so that they exert substantially no pressure on the bushings 6. When the assembly is in the free-wheel position of FIGURE 2, the clamping elements 8 are only pivoted through a small angle so that the resilient bushings are elastically deformed. In this way a restoring force is applied to the clamping elements in the direction of engagement of the coupling, so that the clamping elements are in continuous contact with the coupling rings. Thus, in the free-wheeling position of the coupling, the pivotable clamping elements 8 make contact with the bushings along two longitudinal strips of the periphery of the latter, each bushing being in contact with each adjacent clamping element along a respective line. This arrangement provides for a favorable transmission of the thrust moments between the bushings and the clamping elements and ensures that a non-resilient, or permanent, deformation of the bushings will not occur.

It is further clear from FIGURES 1 and 2 that the cylindrical portions of the resilient bushings 6 are capable of moving substantially as a unit relative to their associated pins 4 so as to be positioned eccentrically with respect to the axes of pins 4. Such movement makes it possible to compensate for inaccuracies in the dimensions of the bushings and the clamping elements and for disparities in the load distribution around the periphery of the coupling assembly. In this way an automatic adjustment will continuously take place when, during a long period of use, some of the engagement surface of the clamping elements 8 become altered by wear. This ability of the bushings to move off center as a unit mainly serves to center the pivotable clamping elements, whereas the above-mentioned resilient deformation of the bushings serves to bias the clamping elements individually in a direction for coupling together the coupling members 1 and 2.

Figure 7:
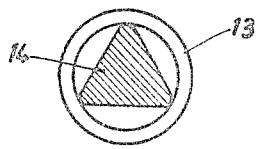
FIGURE 7 is a cross-sectional view of another form of bushing with its associated pin.
Figure 8:
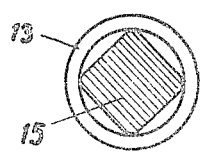
FIGURE 8 is a similar view to that of FIGURE 7 for another embodiment of the present invention.

The bushings 6 may consist of sections of tube as shown in FIGURE 5, the tongues or tabs 7 being cut out of the bushings and then bent over. Alternatively, as shown in FIGURE 6, a bushing 6' may be rolled into cylindrical shape from a flat metal strip. The gap 12 remaining is not disadvantageous in any way. The tongues 7 are formed in the manner described above. The bushings 6 or 6' and the recesses 9 need not necessarily have a cylindrical cross section. Moreover, instead of resilient tongues 7 it is possible to use other kinds of resilient elements, e.g., resiilent rubber pads or buffers, elastic inlays, etc. When the bushings are moved as a unit with respect to their pins 4, tongues 7, because of their resiliency, continue to clamp the bushings on the pins. Referring now to FIGURES 7 and 8, the bushings may also consist of cylindrical casings 13 made of elastic rubber material or of a suitable synthetic plastic material. In this case the pins of the cage will preferably have a polygonal cross-sectional shape, the pin 14 of FIGperiphery of the bushings at spaced points about the periphery of the pins. The manner of operation and purpose of these bushings 13 is the same as the above-described bushings 6.

According to the embodiment of the present invention here claimed, each bushing is disposed in a bore of one of the pivotable clamping elements so as to pivot together therewith. Each bushing is provided with a bore extending completely therethrough and the associated pins are of a polygonal cross section shape complementary to that of the bores in the bushings and are received by the cage side plates so as to be rigid in rotation therewith. The radial wall portions of each clamping elements are shaped to define arcuate protuberances whose curvatures are concentric with the axis of the associated clamping element bore. Adjacent pivotable clamping elements are in contact with one another within the region defined by the coupling cage.

This embodiment of the invention is particularly suitable for free-wheel couplings designed to transmit large forces. Each clamping element is mounted on a pin inside the coupling cage. The clamping elements are capable of moving a small amount in the circumferential direction of the cage by reason of the resilient action of the bushings, so that it is possible to compensate for inaccuracies in the fit of the coupling cage between the inner and outer coupling members and for fluctuations in the loading on the clamping elements around the periphery of the coupling. Futhermore, when each clamping element is pivoted in the free-wheeling direction, a restoring moment is created in a direction for coupling the members together.

Figure 9:
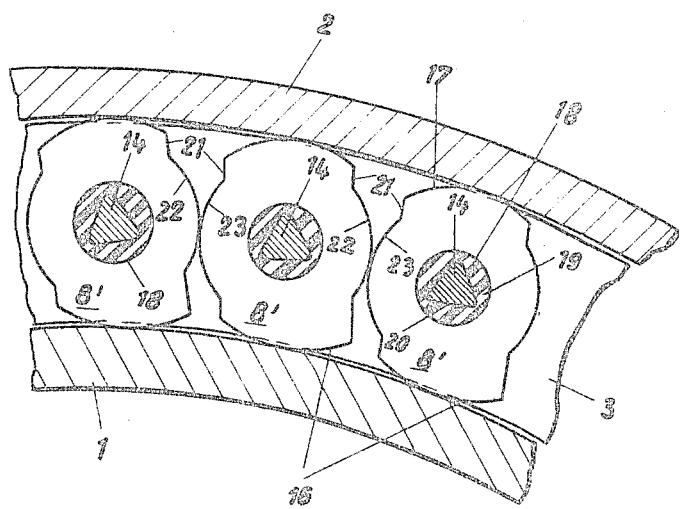
FIGURE 9 is a view similar to that of FIGURE 1 of the embodiment of the present invention.

One form of construction of such an embodiment is shown in FIGURE 9 wherein pivotable clamping elements 8' are mounted between annular side plates 3. Each clamping element 8' has coupling surfaces 16 and 17 which are shaped in a manner known per se and which cooperate with the inner coupling member 1 and the outer coupling member 2, respectively. Formed in each clamping element 8' is a bore 18 which receives an associated bushing 19, made of a resilient material, in such a manner that the clamping element and bushing are rigid in rotation with one another. For example, a bushing 19 of elastic rubber material may be vulcanized, pressed, or sprayed into the cooperating bore 18. The bushing 19 is provided with an enclosed through bore 20 of polygonal cross-sectional shape in which a pin 14 of corresponding polygonal cross-section is received. Each of the pins 14 is secured in the coupling rings 3 so as to be rigid in rotation therewith. It is also possible to use, instead of the triangular pin shown in FIGURE 9, a pin of rectangular cross-section or of any other polygonal cross-sectional shape, the enclosed through bore 20 of bushing 19 being shaped in a complementary manner to those alternative shapes of the pin. The radial wall portions 21 of the clamping elements 8' are formed with arcuate protuberances 22 and 23 whose contours are concentric with the axes of the bores 18. The dimensions of the clamping elements are such that adjacent clamping elements will always be in contact with one another along the surfaces of protuberances 22 and 23.

The pivotable clamping elements 8' are in mutual, position-maintaining engagement with each other within the cage. When the individual clamping elements pivot, the arcuate protuberances 22, 23 on the walls of adjacent clamping elements slide upon each other. The bushings 19, each of which is mounted on a respective one of the pins 14, is capable of shifting, substantially as a unit and in consequence of its elastic properties, by a slight amount in the direction of the circumference of the cage assembly, thereby to effect a centering of the clamping elements and to effect an automatic compensation for dimensional variations and non-uniform wear. When the clamping elements pivot, or when disengagement of the coupling takes place, an elastic deformation of the bushings 19 occurs, creating a restoring moment which urges the clamping elements toward the position which they assume during engagement of the coupling. During this phase of operation, the arcuate wall protuberances 22, 23 of adjacent bushings slide over each other. The clamping elements are thus permanently biased in the direction of engagement of the coupling, so that whenever coupling engagement between the members 1 and 2 take place, impact shocks will not occur.

It will be understood that the above description of the present invention is susceptible to various modifications, changes, and adaptations.

We claim:

1. In a one-way clutch assembly for rotatively coupling an outer rotary member to an inner rotary member for one direction of relative rotation between the members and for decoupling the members from one another for the opposite direction of relative rotation between them, which assembly includes annular side plates disposed between the inner and outer members, connecting pins extending between and connecting the plates, and a plurality of pivotable clamping elements interposed between the members, retained between the plates, and provided with rounded side portions by which they contact the members, the clamping elements being pivotable, under the influence of the relative rotation between the members, between a first position in which they couple the members rotatively together and a second position in which the members are operatively decoupled, the improvement comprising a plurality of resilient bushings disposed between the plates and each mounted on a respective connecting pin, said bushings cooperating with said clamping elements, when the latter are in their said second position, for urging said elements toward their said first position, said bushings being moveable with respect to their associated pins in a direction perpendicular to the axes of their associated pins for compensating dimensional inaccuracies in the assembly and for placing said elements in force-transmitting communication with one another so as to produce a uniform distribution among said elements of the load forces applied thereto by the rotary members, each said clamping element being provided with an axial bore in which a respective one of said bushings is disposed, the outer surface of each said bushing being attached to the wall of its associated clamping element bore for pivotal movement together with its associated clamping element, each said bushing being provided with a bore having polygonal cross-section, and each said pin having the same cross-section as the bore of its associated bushing and having its ends rigidly connected to said annular side plates.

2. An arrangement as defined in claim 1, wherein adjacent clamping elements contact one another, and the wall portion of each said clamping element in contact with an adjacent clamping element is formed with an arcuate protuberance whose curvature is concentric with the axis of the bore provided in said clamping element.

References Cited

UNITED STATES PATENTS

| 2,364,280 | 12/1944 | Dodge | 192—45.1 |
| 2,365,062 | 12/1944 | Dodge | 192—45.1 |
| 2,555,484 | 6/1951 | Gruenberg et al. | 192—45.1 |
| 2,599,793 | 6/1952 | Warner | 192—45.1 |
| 2,614,670 | 10/1952 | Heintz | 192—45.1 |
| 2,822,905 | 2/1958 | Dodge | 192—45.1 |

MARK M. NEWMAN, Primary Examiner

A. D. HERRMANN, Assistant Examiner